(12) United States Patent
Kiefer

(10) Patent No.: US 7,579,388 B2
(45) Date of Patent: *Aug. 25, 2009

(54) RADIATION CURABLE INK COMPOSITIONS AND APPLICATIONS THEREOF

(75) Inventor: Laura A. Kiefer, Elkins, NH (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/110,331

(22) Filed: Apr. 27, 2008

(65) Prior Publication Data

US 2008/0226833 A1    Sep. 18, 2008

Related U.S. Application Data

(63) Continuation of application No. 10/986,561, filed on Nov. 10, 2004, now Pat. No. 7,365,105.

(60) Provisional application No. 60/519,200, filed on Nov. 12, 2003.

(51) Int. Cl.
C09D 11/00 (2006.01)
C09D 11/10 (2006.01)
C08F 2/46 (2006.01)
C08F 2/50 (2006.01)

(52) U.S. Cl. .................. 522/121; 522/113; 522/114; 522/120; 522/178; 522/153; 522/104; 522/106; 522/107; 522/182; 427/508; 427/511; 427/514; 427/510

(58) Field of Classification Search .............. 522/121, 522/113, 114, 120, 178, 153, 104, 106, 107, 522/182; 427/508, 511, 514, 510; 106/31.13, 106/31.6
See application file for complete search history.

(56) References Cited

U.S. PATENT DOCUMENTS

| | | | |
|---|---|---|---|
| 5,270,368 A | 12/1993 | Lent et al. | |
| 5,889,084 A | 3/1999 | Roth | |
| 5,958,169 A | 9/1999 | Titterington et al. | |
| 6,051,628 A | 4/2000 | Bishop et al. | |
| 6,114,406 A | 9/2000 | Caiger et al. | |
| 6,145,979 A | 11/2000 | Caiger et al. | |
| 6,193,792 B1 | 2/2001 | Fague | |
| 6,200,369 B1 | 3/2001 | Schwarz | |
| 6,204,307 B1 | 3/2001 | Miyabayashi | |
| 6,232,359 B1 | 5/2001 | Christian | |
| 6,232,361 B1 | 5/2001 | Laksin et al. | |
| 6,239,189 B1 | 5/2001 | Narayan et al. | |
| 6,239,193 B1 | 5/2001 | Cheng et al. | |
| 6,300,388 B1 | 10/2001 | Verdonck et al. | |
| 6,310,115 B1 | 10/2001 | Vanmaele et al. | |
| 6,326,419 B1 | 12/2001 | Smith | |
| 6,331,204 B1 | 12/2001 | Can et al. | |
| 6,344,497 B1 | 2/2002 | Meyrick et al. | |
| 6,370,444 B1 | 4/2002 | Kusunoki | |
| 6,379,444 B1 | 4/2002 | Adkins et al. | |
| 6,417,249 B1 | 7/2002 | Nguyen et al. | |
| 6,461,419 B1 | 10/2002 | Wu et al. | |
| 6,467,897 B1 | 10/2002 | Wu et al. | |
| 6,550,905 B1 | 4/2003 | Deckers | |
| 6,558,753 B1 | 5/2003 | Ylitalo et al. | |
| 6,593,390 B1 | 7/2003 | Johnson et al. | |
| 7,365,105 B2 * | 4/2008 | Kiefer-Liptak | 522/121 |
| 2002/0085056 A1 | 7/2002 | Ylitalo | |
| 2002/0086914 A1 | 7/2002 | Lee et al. | |
| 2002/0122106 A1 | 9/2002 | Ylitalo | |
| 2002/0133106 A1 | 9/2002 | Peled | |
| 2002/0149659 A1 | 10/2002 | Wu et al. | |
| 2002/0175984 A1 | 11/2002 | Ylitalo et al. | |
| 2003/0035037 A1 | 2/2003 | Mills et al. | |
| 2003/0092820 A1 | 5/2003 | Schmidt et al. | |
| 2003/0158283 A1 | 8/2003 | Ylitalo et al. | |

FOREIGN PATENT DOCUMENTS

| | | |
|---|---|---|
| EP | 1 323 795 | 12/2001 |
| EP | 1 344 805 | 2/2003 |
| WO | WO 97/31071 | 8/1997 |
| WO | WO 99/29787 | 6/1999 |
| WO | WO 02/38687 | 5/2002 |
| WO | WO 02/38688 | 5/2002 |
| WO | WO 02/061001 | 8/2002 |
| WO | WO 2004/005412 | 1/2004 |
| WO | WO 2004/026978 | 4/2004 |
| WO | WO 2004/031308 | 4/2004 |
| WO | WO 2004/085554 | 10/2004 |

OTHER PUBLICATIONS

PCT/US2004/037467 Int'l Search Report and Written Opinion in Counterpart WO Case, Aug. 3, 2005, Electronics for Imaging, Inc.
EP 04810664.5 Examiner's Report in Counterpart EP Case, Sep. 28, 2006, Electronics for Imaging, Inc.
EP 04810664.5 Examiner's Report in Counterpart EP Case, Feb. 5, 2007, Electronics for Imaging, Inc.

* cited by examiner

*Primary Examiner*—Sanza L. McClendon
(74) *Attorney, Agent, or Firm*—Michael A. Glenn; Glenn Patent Group

(57) ABSTRACT

Radiation curable ink compositions that include a curable component having a functionality that is greater than two, is present in the ink composition in an amount greater than 30 percent by weight, and has a molecular weight in the range of about 400 g/mole to about 10,000 g/mole; a component that has a functionality that is less than or equal to 2; and an initiator component. A solvent component, pigment, a surface tension modifier and other materials also can be included. The radiation curable inks are employed in ink jet printers and are particularly suited for use in printing on large-scale substrates. The printed images described herein have good adhesion to polymeric substrates such as styrene-based, polycarbonates, polyolefins, polyethylene terephthalate glycol ester, acrylic and others.

20 Claims, No Drawings

RADIATION CURABLE INK COMPOSITIONS AND APPLICATIONS THEREOF

REFERENCE TO RELATED APPLICATIONS

This application is a continuation of U.S. patent application Ser. No. 10/986,561, filed 10 Nov. 2004, now U.S. Pat. No. 7,365,105, which claims the benefit of U.S. Provisional Application No. 60/519,200, filed on Nov. 12, 2003, which are incorporated by reference herein in their entirety.

BACKGROUND

Generally, during ink jet printing, ink is ejected onto a substrate in controlled patterns of closely spaced dots to produce printed text, graphics, holograms, and other images.

Both solvent-based and radiation-curable inks are currently available for ink jet printing. Ink jet printing with aqueous-based or organic solvent-based formulations generally includes a drying operation during which the water or organic solvent present in a deposited fluid ink dot is evaporated, leaving a solid print residue on the substrate. While organic solvents generally have high vapor pressures and are easily evaporated during drying, they pose environmental, safety or health hazards and often require special handling. Water-based inks are safer to use; however, drying such inks generally is more energy-intensive.

Radiation curable inks are hardened by exposure to radiation. To address drying-related problems described above, these inks generally are formulated to minimize and preferably eliminate the use of non-reactive diluents. For example, several existing radiation curable inks have been formulated to rely on "reactive diluents," such as functionalized monomers that, together with other ingredients, crosslink to form the printed image.

Radiation curable inks are printed onto numerous substrates, both rigid and flexible. These include polymeric substrates, such as various types of PVC as well as polystyrene (usually modified), polycarbonate, acrylonitrile-butadiene-styrene (ABS), polyolefines, polyesters, and others. The appearance of the printed image is affected by "jettable" characteristics of the ink, such as ink viscosity, droplet formation, satellite formation, drying or curing time and other properties that relate to the ejection of the ink from the print head, droplet travel and impact onto substrate.

When used for outdoor displays, such as billboards, busboards, or vehicle decoration, many of the existing ink formulations are found to result in premature peeling or flaking. Some exhibit poor flexibility when folded or wrinkled as evidenced by cracking and/or crazing. In many cases, existing ink formulations perform well on a specific substrate material but are found to have poor adhesion when printed on a different substrate. On the pencil hardness scale, existing formulations often are soft, typically having a hardness that is less than B.

Therefore, a need continues to exist for radiation-curable ink compositions that adhere well to multiple substrates, form printed images having good appearance, improved hardness and good flexibility and that are capable of withstanding outdoor weather conditions.

SUMMARY

The invention generally relates to radiation-curable ink compositions for inkjet printing, to methods for using them and to printed displays produced by curing the ink compositions on a substrate. In one embodiment, the invention is directed to radiation-curable ink compositions for inkjet printing on multiple substrates.

The ink compositions of the invention include a curable component that has a functionality that is greater than 2, has a molecular weight in the range of from about 400 g/mole to about 100,000 g/mole, and that is present in the ink composition in an amount greater than 30 percent by weight; a radiation curable component that has a functionality that is less than or equal to 2; an initiator component; and, optionally, a non-aqueous and, preferably, non-reactive solvent component that is present in the ink composition in an amount of at least 5 percent by weight. In several examples, the non-aqueous, non-curable solvent component includes a solvent that is moderately soluble in water, such as 2-butoxyethyl acetate.

The invention is directed to a method for inkjet printing on polymeric substrates. The method includes the steps of delivering the curable ink compositions described above from a printerhead in an inkjet printer onto the substrate and exposing the ink composition to radiation, thereby curing it on the substrate.

In other embodiments, the invention also is directed to printed display signs that include a polymeric substrate and a printed image adhered on the substrate, wherein the printed image is formed by curing the ink compositions described above.

Ink compositions of the invention are compatible with ink jet printing systems, in particular systems designed to produce signage and other large-scale displays. They have favorable dot gain characteristics and result in good quality printed images that exhibit good adherence to many of the substrates being used in outdoor displays. In addition, the printed images are water resistant, have good flexibility characteristics as well as improved hardness, as measured on the pencil hardness scale. Images formed with ink compositions of the invention are expected to withstand outdoor weather conditions without premature flaking or peeling The ink compositions of the invention can be formulated in the absence of high viscosity polyurethanes. In comparison with conventional, organic solvent-based inks, the compositions of the invention are formulated with lesser amounts of organic solvent, or without organic solvent, and thus pose less health, safety and environmental concerns.

Non-aqueous, non-curable solvents provide several advantages when incorporated into the radiation curable ink compositions of the invention. For example, these solvents contribute to overall viscosity properties of the ink, provide solvation of reactive monomers and oligomers employed and are compatible with nonporous, polymeric substrates currently in widespread use in the sign making industry.

DETAILED DESCRIPTION

The foregoing and other objects, features and advantages of the invention will be apparent from the following more particular description of preferred embodiments of the invention.

The invention generally relates to ink compositions and to methods and systems for using them. More particularly, the invention relates to radiation-curable ink compositions for ink jet printing. Radiation curable inks are hardened or set by actinic radiation, for example ultraviolet radiation.

Ink Compositions

The ink compositions of the invention include several chemical compounds. Compounds that share a property or a function in the ink composition of the invention are collectively referred to as a "component."

Among the materials generally present in the formulations described herein, the ink compositions of the invention include radiation curable monomers or oligomers that participate in crosslinking reactions. Crosslinking reactions take place, for instance, via cationic or free radical mechanisms, during radiation-curing of the ink and result in a hardened material, such as print on a substrate. As used herein, the term "monomer" refers to a material that has an average molecular weight that is less than about 400 grams per mole (g/mole). The term "oligomer" refers to intermediate molecular weight materials, having an average molecular weight of at least about 400 g/mole and generally not higher than about 100,000 g/mole.

Curable materials in the ink composition of the invention are described herein by their functionality. Those radiation curable monomers or oligomers that share the same functionality are referred herein as a "component" that has that functionality. As used herein, the term "functionality" refers to a chemical group, bond or moiety that is capable of participating in a crosslinking reaction when exposed to curing energy.

Preferred examples of functional, also known in the art as "reactive," groups, include (meth)acrylic-type functional groups, such as found, for instance, in alkoxylated acrylates, e.g., alkoxylated triacrylates. The term "(meth)acrylic" refers to acrylic and methacrylic groups. These molecules may contain other functional groups that also can participate in crosslinking and polymerization reactions in the presence of curing energy. Functional groups that may not cure in this step also can be present. Examples of non-(meth)acrylic-type functional groups include hydroxyl, epoxy (epoxy groups generally cure by a cationic mechanism), carboxylic acid, and other groups. Compounds containing such groups include styrene, 9-decene-1-ol, 1-dodecene, 1,4-pentadiene, vinylbenzoate, vinyl-4-tert-butylbenzoate, poly(butadiene) or hydroxy- or epoxy-functionalized poly(butadiene) and many others.

The radiation curable ink compositions of the invention include a first curable component. This component has a functionality that is greater than two (2), a molecular weight of at least, and preferably greater than, about 400 g/mole and is present in the ink compositions in an amount that is greater than 30 percent (%) by weight of the total ink formulation. The ink compositions of the invention also include a second curable component; the second curable component has a functionality that is less than or equal to 2. In some embodiments, the radiation curable ink compositions of the invention includes a non-aqueous and preferably non-reactive solvent component. Other materials, such as, for instance, pigments and surfactants, also can be present. Generally, the ink compositions include one or more initiator component(s).

The first curable component includes at least one oligomer that has more than two functional groups, bonds or moieties (e.g., three double bonds per molecule) that are capable of participating in crosslinking reactions. Tri-functional, tetra-functional, or higher functionality materials can be employed to form this component, depending on the number of reactive groups, bonds or moieties per molecule that are available for crosslinking. More than one oligomer, each having a functionality greater than 2, can be employed. Functional groups that are present in any one oligomer and that are capable of participating in crosslinking can be the same or different. In a preferred embodiment, oligomer(s) employed to form this component have a functionality≧3.

Suitable materials that can be employed to form this component include triacrylates, tetraacrylates or pentaacrylates as well as alkoxylated or polyalkoxylated derivatives thereof. Tri-functional, tetra-functional, penta-functional and higher functionality acrylate oligomers also can be used.

In one example, the curable component that has a functionality that is greater than two includes ethoxylated trimethylolpropane triacrylate, abbreviated as EO(TMPTA) or as TMPEOTA. In one embodiment, EO(TMPTA) is present in the ink compositions of the invention in an amount in the range of from about 22 to about 31 weight percent.

In another example, this component includes at least one hyperbranched or dendridic oligomer. In contrast to linear polymers and oligomers, dendrimers are characterized by structures that are densely branched, are approximately spherical in shape and have a large number of end groups. Hyperbranched polymers are similar to dendrimers, but have less regular, well-defined structures and generally are more amenable to industrial synthesis techniques. In a specific example, the component having a functionality greater than 2 includes a hyperbranched acrylate oligomer based on a hyperbranched aliphatic polyester polyols available under the code of CN-2300 from Sartomer Co., Inc., Exton, Pa. CN-2300 has a functionality of 14. In one embodiment, this material is present in the ink compositions of the invention in an amount in the range of from about 0 to about 9 weight percent.

In yet another example, the curable component that has a functionality that is greater than two includes a polyester tetraacrylate oligomer, such as, for example, a material available from UCB-Surface Specialties, Smyrna, Ga., under the designation of EBECRYL® 1810. In one embodiment, this material is present in the ink compositions of the invention in an amount in the range of from about 2 to about 11 weight percent.

In preferred examples, the component that has a functionality greater than 2 includes combinations of oligomers, each oligomer having a functionality greater than 2. In one embodiment, the combinations include EO(TMPTA). In a preferred embodiment, EO(TMPTA) is present in the component having a functionality greater than 2 in an amount of at least about 50 weight percent, more preferably in an amount of at least 65 weight percent. In another preferred embodiment, the radiation curable component that has a functionality that is greater than 2 preferably includes ethoxylated (3)trimethyloylpropane triacrylate or 3(EO)TMPTA and CN-2300. Typically, CN-2300 is present in an amount not greater than about 15% (w/w) and 3(EO)TMPTA is present in an amount not less than about 16% (w/w).

Other suitable materials that can be used to form this component are propoxylated (6) trimethylolpropane triacrylate, propoxylated (5.5) glycerol triacrylate, trimethylolpropane trimethylacrylate, trimethylolpropane triacrylate, pentaerythritol triacrylate, pentaerytritol tetracrylate, di-methylolpropane tetraacrylate, dipentaerythritol pentaacrylate, pentaacrylate ester, and other ethoxylated, propoxylated, polyethoxylated or polypropoxylated derivatives of these compounds. Other examples of materials that have a functionality that is greater than 2 include epoxidized soybean oil acrylate (Sartomer), and dipentaerythritol monohydroxy pentaacrylate.

The curable component that has a functionality greater than 2 has a molecular weight in the range of from about 400 g/mol to about 100,000 g/mole. In other words, the component is formed using one, and preferably more than one oligomer having a molecular weight in the range of from about 400 g/mole to about 100,000 g/mole. The component that has a functionality greater than 2 generally has an overall viscosity that is greater than about 50 centipoise (cps) at 25° C.

The ink compositions of the invention also include a second curable component. This component has a functionality that is less than or equal to two. Mono-functional as well as di-functional monomers or oligomers can be employed. Specific examples include styrene, alpha-methylstyrene, other substituted styrenes, vinyl esters, N-vinyl-2-pyrrolidone, (meth)acrylamide, N-substituted (meth)acrylamide, octyl (meth)acrylate, nonylphenol ethoxylate (meth)acrylate, isononyl (meth)acrylate, isobornyl (meth)acrylate, 2-(2-ethoxyethoxy)ethyl (meth)acrylate, 2-ethylhexyl (meth)acrylate, lauryl (meth)acrylate, beta-carboxyethyl (meth)acrylate, isobutyl (meth)acrylate, cycloaliphatic epoxide, alpha-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxy functional caprolactone ester (meth)acrylate, isooctyl (meth)acrylate, hydroxyethyl (meth)acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, oligomers, for example, isobornyl acrylate (IBOA), (meth)acrylated epoxies (e.g., epoxy (meth)acrylates), (meth)acrylated polyesters (i.e., polyester (meth)acrylates), (meth)acrylated (meth)acrylics, (meth)acrylated silicones, (meth)acrylated polyethers (e.g., polyether (meth)acrylates), vinyl (meth)acrylates, (meth)acrylated oils, combinations thereof and others.

Other materials with a functionality that is less than or equal to 2 include, but are not limited to, alkoxylated (e.g., ethoxylated or propoxylated) neopentylglycol diacrylates, alkoxylated (e.g., ethoxylated or propoxylated) hexanediol diacrylates, dipropylene glycol diacrylate, cyclohexanediol diacrylate, and others.

In preferred examples, the ink composition of the invention includes one or more of the following: ethoxylated (2) neopentylglycol diacrylate, propoxylated (2) neopentylglycol diacrylate, 1,4-cyclohexanedimethanol diacrylate, tetrahydrofurfuryl acrylate, isobornyl acrylate, ethoxylated 1,6-hexanediol diacrylate, propoxylated-1,6-hexanediol diacrylate, dipropylene glycol diacrylate; styrene; SR-9209(A) or SR-9209, from Sartomer Co., Inc., Exton, Pa.; propoxylated (2) neopentylglycoldiacrylate; 1,6-hexanedioldiacrylate; propoxylated-1,6-hexanedioldiacrylate; 1,4-cyclohexanedimethanol diacrylate; other cycloaliphatic compounds containing acrylate or vinyl groups; or any combination thereof.

The radiation curable component that has a functionality that is less than or equal to 2 is present in the ink composition of the invention in an amount that is less than 70 weight %. Preferably, this component is present in the ink composition of the invention in an amount in the range of from about 45% to about 51% by weight.

Generally, this component has a molecular weight less than about 400 g/mole.

The component that has a functionality that is less than or equal to 2 preferably has a viscosity of less than about 50 cps at 25° C. Monomers as well as oligomers can be employed to form this component.

Preferred ink compositions of the invention include at least one silicone acrylate, also known as an acrylated siloxane or acrylated polysiloxane. Silicone acrylates are crosslinkable and are believed to modify the overall surface tension of the ink. In one embodiment, the silicone acrylate has a functionality that is greater than 2. Preferred examples of silicone acrylates are those available under the Trademark of TEGO® (Goldschmidt Chemical Corp., Hopewell, Va.). A particularly preferred silicone acrylate is TEGO® Rad 2200N. A material such as TEGO® Rad 2200N preferably is present in the ink compositions of the invention in an amount that is at least 0.01 weight percent, for instance, in an amount in the range of from about 0.02 to about 1 weight percent. Examples of other suitable organosilicon materials also can be obtained from GE Silicones, Wilton, Conn. Other organosilicon as well as non-organosilicon-based surface tension modifiers also can be employed.

The ink compositions of the invention include an initiator component. For UV curable ink compositions, this component preferably includes at least one photoinitiator compound. Examples of photoinitiators include, 2,2-dimethyl-2-hydroxy-acetophenone; 1-hydroxy-1-cyclohexyl-phenyl ketone; 2,2-dimethoxy-2-phenylacetophenone; 2-benzyl-2-dimethylamino-1-(4-morpholinophenyl)-butan-1-one; 2-methyl-1-[4-(methylthio)phenyl]-2-morpholino-propan-1-one; 2,4,6-trimethylbenzyl-diphenyl-phosphine oxide, 1-chloro-4-propoxythioxanthone; isopropyl thioxanthone (mixture of 2- and 4-isomers); blends of bis(2,6-dimethoxybenzoyl)-2,4,4-trimethyl pentyl phosphine oxide and 1-phenyl-2-hydroxy-2-methyl propanone; blends of bis (2,6-dimethoxybenzoyl)-2,4,4-trimethyl pentyl phosphine oxide and 1-hydroxy-cyclohexyl-phenyl ketone, bis(2,4,6-trimethylbenzoyl)phenylphosphine oxide; and camphorquinone. Co-initiators and amine synergists can be included in order to improve curing rate. Examples include isopropylthioxanthone, ethyl-4-(dimethylamino)benzoate, 2-ethylhexyl dimethylaminobenzoate, and dimethylaminoethyl methacrylate.

The type of photoinitiator used generally depends on the choice of colorant in the ink and on the wavelength of the curing radiation. Commercially available free-radical generating photoinitiators suitable for the invention include, but are not limited to benzophenone, benzoin ether and acylphosphine photoinitiators such as those sold under the trade designations IRGACURE® and DAROCURE® from Ciba Specialty Chemicals, Tarrytown, N.Y.

In preferred embodiments, the initiator component includes benzophenone and reactive amine coinitiators, generally employed to activate the benzophenone initiator. One preferred reactive amine coinitiator is available from Sartomer Co., Inc., Exton, Pa., under the trade name of CN-386. Other initiators that can be employed include, but are not limited to, ethyl-2,4,6-trimethylbenzoylphosphine, or combinations of 2,4,6-trimethylbenzoyl-diphenyl-phosphineoxide with 2-hydroxy-2-methyl-1-phenyl-propan-1-one, such as available under the tradename of DAROCURE® 4265 (Ciba Specialty Chemicals, Tarrytown, N.Y.). In some ink compositions of the inventions, DAROCURE® 4265, used alone or in combination with benzophenone and CN-386 was found to increase cure rate.

Generally, the initiator component is present in the ink composition of the invention in an amount in the range of from about 1% to about 20% by weight. Preferably the initiator is present in an amount of about 5 to about 16 weight %.

For some applications, the radiation curable ink compositions of the invention also include a non-aqueous solvent component. Non-reactive, also referred to as non-curable, solvents are preferred. Non-reactive solvent also can be referred to as diluents. Generally, the solvent component is present in the ink compositions in an amount of at least about 5% by weight. Preferably, the non-aqueous, non-curable solvent component is present in the ink compositions of the invention in an amount that is less than 10% by weight. In one embodiment, the amount of solvent is in the range of from about 5 to about 7 weight %. A single solvent or a combination of solvents can be employed.

Examples of non-aqueous, non-curable solvents include aliphatic hydrocarbons, e.g. heptane, cyclohexane, alcohols such as isopropyl alcohol (IPA) or ethanol; ketones such as methyl ethyl ketone, cyclohexanone, or acetone; aromatic hydrocarbons, e.g., toluene; isophorone; butyrolactone; N-methylpyrrolidone; tetrahydrofuran; esters such as lactates, acetates, e.g., propylene glycol monomethyl ether acetate (PM acetate), diethylene glycol ethyl ether acetate (DE acetate), ethylene glycol; butyl ether acetate (EB acetate), dipropylene glycol monomethyl acetate (DPM acetate); iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like.

Without intending to be held by a particular mechanism, it is believed that solvents assist adhesion to the substrate by enhancing the ability of the ink composition to wet out the substrate. It is further believed that some solvents can dissolve at least a few top monolayers of the substrate surface, thereby increasing the compatibility of the ink with the substrate.

Generally, solvents are selected based on several criteria. For example, solvents are selected based on their performance, in particular, their wetting and/or dissolving properties with respect to the substrate.

In one example, 2-butoxyethyl acetate performed well with respect to styrene substrates. Another solvent expected to perform well with respect to a large number of substrates is acetone. Hydrocarbon solvents are expected to impart good adhesion properties to less polar substrates, e.g. polyolefin substrates.

Practically, solvents also are selected based on safety, since highly flammable and highly volatile solvents pose fire hazards when jetted at high temperatures, e.g., 55° C., and when used near an ignition or spark source. Also preferred are environmentally acceptable solvents.

Both polar and nonpolar solvents can be employed. Polar solvents generally are miscible with water to varying degrees. Examples of polar solvents include alcohols, e.g., 2-propanol, 1-propanol, 1-butanol and others. Preferably, polar solvents are employed in compositions formulated for ink jet printing on substrates containing somewhat polar moieties, such as polyesters or polycarbonates.

Nonpolar solvents are immiscible with water. Suitable non-polar solvents include aliphatic, cycloaliphatic or aromatic hydrocarbons, toluene, fluorocarbons, and others. Preferably, nonpolar solvents are employed in compositions formulated for ink jet printing on nonpolar substrates such as polyolefin, e.g., polypropylene substrates. Non-polar solvents also are believed to have low affinity for some dispersants employed in many commercial pigment systems and thus are unlikely to result in pigment agglomeration and ink instabilities.

Specific examples of nonpolar solvents include aliphatic and cycloaliphatic hydrocarbons, alkyl ethers, aliphatic alcohols and others. Aliphatic alcohols are preferred.

A preferred ink composition of the invention includes 2-butoxyethyl acetate.

2-butoxyethyl acetate, also is known as: ethylene glycol monobutyl ether acetate; butyl glycol acetate; or acetic acid, 2-butoxyethyl ester. It is a clear, low volatility liquid that is miscible with many organic solvents such as alcohols, ketones, aldehydes, ethers, glycols and glycol ethers. Its solubility in water is moderate (1.7 g/100 ml at 20° C., as reported by the International Occupational Safety & Health Information Center, Data Sheet ICSC0839. 2-butoxyethyl acetate is accepted by the industry and is presently used in many commercial organic solvent-based ink formulations.

In another embodiment, the ink compositions of the invention include solvents that are available under the name of EXXATE®, e.g. EXXATE® 1000 (CAS Registry No. 68529-83-0), from Exxon Mobil Chemical Co. These solvents are mixtures of linear and branched alcohols.

For other applications, the ink compositions of the invention do not include a solvent (non-reactive diluent) component.

If color is desired, the ink compositions of the invention also include a pigment component. Pigments that resist fading are preferred. The pigment component is present in the ink composition in an amount in the range of 0%, for producing a clear coating, to about 10% by weight.

Both organic and inorganic pigments can be incorporated in the ink composition of the invention. Examples of inorganic pigments include carbon black and titanium oxide ($TiO_2$).

Suitable organic pigments include phthalocyanines, anthraquinones, perylenes, carbazoles, monoazo- and disazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazoacrylides, anthrapyrimidines, and others known in the art.

Pigments that can be employed are available commercially under the designation of Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24, and Pigment Blue 60; Pigment Brown 5, Pigment Brown 23, and Pigment Brown 25; Pigment Yellow 3, Pigment Yellow 14, Pigment Yellow 16, Pigment Yellow 17, Pigment Yellow 24, Pigment Yellow 65, Pigment Yellow 73, Pigment Yellow 74, Pigment Yellow 83, Pigment Yellow 95, Pigment Yellow 97, Pigment Yellow 108, Pigment Yellow 109, Pigment Yellow 110, Pigment Yellow 113, Pigment Yellow 128, Pigment Yellow 129, Pigment Yellow 138, Pigment Yellow 139, Pigment Yellow 150, Pigment Yellow 154, Pigment Yellow 156, and Pigment Yellow 175; Pigment Green 1, Pigment Green 7, Pigment Green 10, and Pigment Green 36; Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60, and Pigment Orange 61; Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207, and Pigment Red 224; Pigment Violet 19, Pigment Violet 23, Pigment Violet 37, Pigment Violet 32, Pigment Violet 42; and Pigment Black 6 or 7 (The Colour Index, Vols. 1-8, by the Society of Dyers and Colourists, Yorkshire, England).

In forming the ink composition of the invention, solid pigment can be combined with one or more liquid materials. Optionally, a commercial pigment can be comminuted, for example by milling, to a desired size, followed by mixing with one or more liquid ingredients.

In other cases, the pigment is provided as a pigment dispersion. Example of commercially available dispersants suitable for this application include those sold under the trade designations SOLSPERSE® from Avecia, Inc. of Wilmington, Del., EFKA® from The Lubrizol Corp. of Wickliff, Ohio, and BYK from BYK Chemie, USA of Wallingford, Conn. It is possible to use mixtures of dispersants also. The amount of dispersant added depends on the type and concentration of the pigment.

In preferred embodiments, pigment dispersions range from 20% (w/w) to 75% (w/w). Pigment slurries for cyan, magenta, yellow, and black preferably are in the range from about 25% to about 30%. Spot color pigment dispersions preferably are in the range of from about 20% to about 30%. White pigment dispersions typically are 70%-75% pigment. Pigment slurries can contain any amount of pigment, with the more concentrated dispersions being preferred.

Additional ingredients such as flow additives, UV light stabilizers, hindered amine light stabilizers, surfactants also can be employed and can be present in the ink compositions of the invention typically in an amount of up to 2 weight percent.

For example, to enhance durability of a printed image graphic, especially in outdoor environments exposed to sunlight, a variety of commercially available stabilizing chemicals can be added to the ink composition. These stabilizers can be grouped into the following categories: heat stabilizers, ultra-violet light stabilizers, and free-radical scavengers. Heat stabilizers are commonly used to protect the resulting image graphic against the effects of heat and are commercially available under the trade designations MARK® V 1923 (Witco Corp. of Greenwich, Conn.); SYNPRON® 1163, Ferro 1237 and Ferro 1720 (Ferro Corp., Polymer Additives Div., Walton Hills, Ohio). Such heat stabilizers can be present in amounts ranging from about 0.02 to about 0.15 weight percent.

Ultraviolet light stabilizers are commercially available under the trade designations UVINOL® 400 (a benzophenone type UV-absorber sold by BASF Corp. of Parsippany, N.J.), Cyasorb UV1 164 from Cytec Industries, West Patterson, N.J., and TINUVIN® 900, TINUVIN® 123 and/or 1130 UV-absorber (Ciba Specialty Chemicals, Tarrytown, N.Y.) and can be present in amounts ranging from about 0.01 to about 5 weight percent of the total ink.

Free-radical scavengers can be present in an amount from about 0.05 to about 0.25 weight percent of the total ink. Nonlimiting examples of the scavenger include hindered amine light stabilizer (HALS) compounds, hydroxylamines, sterically hindered phenols, and the like.

Commercially available HALS compounds include TINUVIN® 292 (trade designation for a hindered amine light stabilizer sold by Ciba Specialty Chemicals, Tarrytown, N.Y.) and CYASORB® UV3581 (trade designation for a hindered amine light stabilizer sold by Cytec Industries, West Patterson, N.J.).

While stabilizers can be added in small amounts, it is preferred to use as little as possible (or none) to prevent interference with the reaction of the cure. A wide variety of gloss agents also can be used. Examples include aminobenzoates, secondary amines, silicones, waxes, morpholine adducts, materials available under trade designations Sartomer CN386, CN381, CN383, and the like.

In addition, the radiation curable ink compositions of the invention can include other additives, such as, for instance, slip modifiers, thixotropic agents, foaming agents, antifoaming agents, flow or other rheology control agents, waxes, oils, plasticizers, binders, antioxidants, photoinitiator stabilizers, gloss agents, fungicides, bactericides, organic and/or inorganic filler particles, leveling agents, opacifiers, antistatic agents, dispersants, and the like.

Preferred radiation curable ink compositions of the invention do not include polyurethanes.

Specific examples of materials and amount ranges in some embodiments of the invention are shown in Table 1, below.

TABLE 1

| Component | Solvent-Based wt. % | Solvent-Free wt. % |
|---|---|---|
| Pigment | 3.0-3.5 | 3.0-5.5 |
| EBECRYL ® 1810 | — | 0-11.0 |
| CN-2300 | 9.0 | 0-9.0 |
| (EO)TMPTA | 23.0 | 22.2-29.0 |
| SR-9209A | — | 5.0 |
| (PO)NPGDA | 8.5 | 4.0-8.4 |
| THFFA | 0-21.0 | 15.5-24.0 |
| IBOA | 0-25.0 | — |
| CHDODA | 5.0 | 5.0 |
| (PO)HDODA | 0.0-11.0 | 9.5-12.0 |
| CHDODA | 0.0-11.5 | 5.0 |
| TEGORAD ® 2200N | 0.5 | 0.02-0.03 |
| EBA | 5.0-7.0 | — |
| Benzophenone | 0-5.0 | — |
| CN-386 | 0.0-5.0 | 5.0-7.5 |
| DAROCURE ® 4265 | 0.0-9.0 | 0-10.0 |
| LUCERIN ® TPO-L | 0.0-10.0 | — |
| Darocure BP | — | 5.0-7.5 |

Abbreviations used herein are as follows:
(PO)NPGDA = propoxylated (2) neopentylglycol diacrylate
CN-2300 = Sartomer polyester/acrylate with > 2 double bonds per molecule
SR-9209(A) = Sartomer alkoxylated aliphatic diacrylate
(EO)TMPTA = ethoxylated trimethylolpropane triacrylate or TMPEOTA
DPGDA = dipropylene glycol diacrylate
THFFA = tetrahydrofurfuryl acrylate
IBOA = isobornyl acrylate
DPGDA = dipropylene glycol diacrylate
(PO)HDDA, also abbreviated (PO)HDODA, = propoxylated-1,6-hexanediol diacrylate
EBECRYL ® 1810 = polyester tetraacrylate oligomer
CHDDA, also abbreviated CHDODA, = 1,4-cyclohexanedimethanol diacrylate
TEGORAD ® 2200N = Goldschmidt acrylated polysiloxane with > 2 double bonds per molecule
EBA = 2-butoxyethyl acetate
DAROCURE ® 4265 = Ciba Specialty Chemicals photoinitiator. 50% 2,4,6-trimethylbenzoyl-diphenyl-phosphineoxide 50% 2-hydroxy-2-methyl-1-phenyl-propan-1-one
Benzophenone = used as an initiator in these formulations
CN-386 = Sartomer reactive amine co-initiator (to activate benzophenone).

Preparation of the Inks

Generally, materials employed in forming the ink compositions of the invention are commercially available. The ink compositions of the invention are prepared by combining these materials in a single step or in several steps.

Mixing techniques that can be employed are known in the art. For example, all ingredients can be combined in one step and blended, stirred, milled, or otherwise mixed to form a homogeneous composition. In another embodiment, at least some radiation curable compounds and, optionally, at least some of the solvent are blended together, with the remaining constituents being incorporated into the resulting composition via blending, milling, or other mixing technique.

In one example, an ink composition of the invention is prepared by adding the pigment slurry first. High viscosity components are added next, followed by the lower viscosity components. Note that components need not be added in descending order of viscosity, only those that are notably higher are preferably added first. Initiators preferably are added last to prevent curing of the ink during processing.

A formulation, such as shown below as an example, can be formulated a number of ways:
 Yellow pigment slurry
 CN-2300—liquid of higher viscosity
 SR-9209A—liquid
 SR-454 [(3EO)TMPTA]—liquid
 SR-9003 [(PO)NPGDA]—liquid SR-285 [THFFA]—liquid
Photomer 4362 [(PO)HDODA]—liquid
CD-406 [CHDODA]—waxy solid
TEGO-RAD 2200N—viscous liquid
Darocure 4265—moderately viscous liquid
Darocure BP—solid flake
CN-386—liquid This and similar formulations have been formulated the following ways:

1. Order shown above (starting with pigment slurry, followed by adding CN-2300 and so on);
2. Order shown except that CD-406 is added last;
3. Order shown except that TEGO RAD added last; while it is recognized that TEGO RAD is very viscous, it is generally added in such a small amount that mixing is not a problem
4. CD-406 is at least partially predissolved in SR-454 and/or other monomers and charged with them. The remainder is added in solid form either last or in order shown above.
5. It is also possible to dissolve the Darocure BP in monomer; however, it is preferred to add the initiators last;

Other procedures may be selected, for example, during scale-up or to optimize manufacturing production.

Ink Properties

Viscosity and surface tension are believed to play a major role in jetting characteristics of an ink, for instance in droplet shape and satellite formation, thus affecting resulting print quality. Inks whose surface tension is greater than about 30 dynes/cm$^2$, for example, often have poor jettability, seen as misdirects, satellites, and poor dot gain. As known in the art, while still in a fluid state, viscosity and surface effects can cause ink deposited on a substrate to contract, this phenomenon being known as "negative dot gain." Ink compositions also can display a "positive dot gain," where the dot expands and spreads out.

The ink compositions of the invention have optimal drop formation, minimal satellite formation, and good frequency response. Satellites are breakaway trailing droplets from high velocity droplets. They occur when trailing fluid breaks away from a high velocity droplet. The resulting satellite is lower velocity, resulting in loss of image definition. Good Frequency response means that one can go to the maximum frequency rating of the print head without loss of jetting performance. Optimal drop formation occurs when there are no/few satellites, and with good frequency response.

Generally, the ink compositions of the invention have a viscosity that is less than 25 cps at jet temperature, preferably in the range of from about 10 cps to about 13 cps at jet temperature. "Jet temperature" is the temperature or temperature range of the printheads during the jetting operation. Generally, the ink compositions of the invention can be employed at a jet temperature in the range of from about 40° C. to about 58° C.

The ink compositions of the invention generally have a surface tensions below 30 dynes/cm$^2$. Ink compositions having a surface tension below 28 dynes/cm$^2$ are preferred and those having a surface tension in the range of from about 25.5 to 26.5 dynes/cm$^2$ are most preferred.

Properties of the cured ink include pencil hardness, adhesion to a substrate, and water resistance.

Pencil hardness values vary depending on color, substrate, and extent of cure. The inks of the invention typically have a hardness of HB, B, and F, and some have a hardness as high as 2H. A pencil hardness scale is shown below, with 8B as the softest and 6H as the hardest:

8B-7B-6B-5B-4B-3B-2B-B-HB-F-H-2H-3H-4H-5H-6H

Preferably, radiation cured ink compositions of the invention result in print that has a hardness greater than B, preferably greater than HB.

A suitable test to determine adhesion of the printed image to the substrate is set forth in the ASTM (American Society for Testing and Materials) Designation D 3359-97, Standard Test Methods for Measuring Adhesion by Tape Test. Generally, an ink composition of the invention exhibits an adhesion of at least 95% when measured by a standard cross-hatched tape test with a 1.5 mm grid spacing, when applied to at least three different substrate type materials. As used herein the term "multiple substrates" refers to at least three different substrate type materials towards which one ink composition when cured, has an adhesion that is at least 95% when measured by a standard cross-hatched tape test with a 1.5 mm grid spacing. The three or more substrates can be selected from polyolefin, polycarbonate, vinyl, polystyrene containing plastics, ABS polyester substrates.

A water resistance test also was developed. The test is as follows: An absorbent cloth (Kimberly-Clark Crew Wipers), about 3"×3" (the exact dimensions are not important, there need only be enough area to do a valid pencil test), is placed on the cured film. The cloth is then saturated with distilled water and allowed to stand in this way for 5 minutes. The cloth is removed, and the film is immediately and gently padded dry. A pencil hardness test is immediately performed and data recorded. The phenomena is reversible and one can measure the time it takes to recover to within one hardness value of original hardness by repeating the test periodically until recovery. Some inks take hours to recover, while others take less than 30 minutes.

Generally, the ink compositions of the invention recover their original hardness in less than 5 min or retain their hardness on certain substrates.

Applications

The ink compositions of the invention are compatible with inkjet printers, and are particularly suited for systems adapted for printing images on large-scale substrates, for example for creating billboards, banners, busboards, sails, advertisement and event images, sails and many others. Preferably, the ink compositions of the invention are used with VUTEK® digital printing systems available from VUTEK Inc, Meredith, N.H., but are compatible with other non-aqueous ink jet printers, such as Inca, Durst, Leggett and Platt printers.

The ink compositions of the invention are employed to form printed images on plastic substrates. The substrate can be rigid or flexible, e.g., a film. Optionally, the substrate can be primed for printing by techniques known in the art, such as, for example, by pre-cleaning with isopropanol, other cleaners or corona treatment.

The ink compositions of the invention are suitable for printing on multiple substrates. Examples of substrates include polystyrene containing plastics, polycarbonate, polyolefin, polyethylene terephthalate glycol ester; acrylonitrile-butadiene-styrene (ABS), vinyl and pressure sensitive adhesive (PSA) materials, such as, for instance PSA vinyl films. These substrate materials are available from various suppliers. A few specific examples are shown in the table below.

TABLE 2

| Name | Type of Material | Supplier |
|---|---|---|
| LEXAN® | Polycarbonate | GE, Pittsfield, MA |
| COROPLAST® | Polyolefin | Coroplast at coroplast.com |
|  | ABS | A variety of supplies, e.g., SPARTECH, distributed by GE Polymer Shapes |
| CONTROLTAC® 180-10 PSA | Vinyl | 3M |

TABLE 2-continued

| Name | Type of Material | Supplier |
|---|---|---|
| Mii PSA | Vinyl | Arlon |
| Avery PSA | Vinyl | Avery Dennison |
| PETG | Polyester | A variety of supplies, e.g., SPARTECH, distributed by GE Polymer Shapes |

During inkjet printing, the fluid ink composition is ejected from the printer head and deposited on the substrate. The composition is set and cured by exposure to radiation. Preferably, the ink composition is exposed to radiation after its deposition on the substrate.

In preferred embodiments, the ink compositions of the invention are cured using actinic radiation, i.e., electromagnetic radiation capable of producing photochemical reaction, for example, light in the visible, ultraviolet or infrared regions of the electromagnetic spectrum. The ink composition can be exposed to monochromatic light, such as obtained by using light filters or a laser. The ink compositions also can be cured by exposure to a broad range of wavelengths, including, for example, both UV and visible wavelengths. Suitable sources of radiation include mercury lamps, xenon lamps, carbon arc lamps, tungsten filament lamps, lasers, electron beam energy, sunlight, and the like. In one example, ink compositions of the invention are cured by using a lamp intensity of about 200 to about 500 watts/inch. Suitable cure energies are in the range of from about 200 to about 300 mJ/cm$^2$.

Curing conditions vary with printer settings, e.g., carriage speed, step size and other parameters.

To prevent or minimize dot gain, the ink can be exposed to a "setting" energy to set the ink, prior to its being fully cured. A preferred printing system that can be employed with the ink composition of the invention is described in U.S. patent application Ser. No. 10/172,761, the entire teachings of which are incorporated herein by reference.

Accelerated particles (e.g., electron beam radiation) or thermal (e.g., heat or infrared radiation) also can be employed.

The solvent component, if present, generally flashes during exposure to radiation. Optional abatement by means such as fans, blowers, hoods, absorption, adsorption, chemical reactions and other treatment or recycling systems can be employed to handle the resulting volatile organic vapors.

Mechanism of Action

Without intending to be bound by a mechanism of action, it is believed that the radiation curable ink composition of the invention yield improved hardness and water resistance properties because of the higher cross-link density. This is a result of the higher level of compounds with a functionality greater than two, which allows for a faster cure rate and greater cross-link density. In turn, this results in a tighter network. This increases hardness and prevents rapid ingress of water. It should be noted that if the cross-link density is too high (system dependent), films may become brittle and abrasion resistance may be reduced.

The invention is further illustrated by the following non-limiting examples.

EXEMPLIFICATION

When making less than 500 g of ink, all components were weighed directly into a brown HDPE Nalgene bottle. After final addition, the bottle was capped tightly and shaken for about one minute. The bottle was then shaken periodically over the next 24 hours to insure that the solids have time to dissolve or placed on a roll mill overnight.

When making more than 500 g of ink, components were charged to a stainless steel beaker equipped with an overhead stirrer which extends through a lid with a hole in the center. The components were added one at a time and allowed to stir at 200 to 300 rpm until the component is mixed or dissolved. For liquid additions, this requires only a minute or two. For the solid additions, more time is allowed to be certain it is dissolved.

If the ink is to be jetted, it was vacuum filtered through a 2.7 micron glass fiber filter then through a 1 micron (nominal) monofilament nylon filter.

All adhesion measurements were conducted according to Test method A—Cross-Cut Tape Test set forth in ASTM Standard Test Methods for Measuring Adhesion by Tape Test D 3359-97. The test included cutting a cross hatched pattern with a blade (1.5 mm blade spacing) and applying tape over the grid, rubbing firmly to ensure contact, followed by rapid removal of the tape back upon itself as close to an angle of 180° as possible. The grid is made by making cuts at ~90° to each other. The test can be further defined by making the cuts ~45° to each other. The grid area was then examined and adhesion test results were classified according to FIG. 1 at page 4 of the referenced ASTM standard. In the examples below, a rating of 5 indicates that no pick-off was observed and a rating of 0 indicates less than 35% adhesion (more than 65% of the print was peeled off). A rating of 4 indicates 95%-100% adhesion (less than 5% pick-off) and ratings of 3, 2 and 1 indicate, respectively, adhesion between 85% and 95%; between 65% and 85%; and between 35% and 65%.

Flexibility tests were conducted as follows.

A crease test includes folding the substrate so that the printed area is on the inside of the fold and pressing on the crease with a rigid object. The substrate is then unfolded and the printed image evaluated to determine if any flaking or delamination of the ink occurred in the creased region. The experiment is then repeated on a new area of the image with the substrate folded in the opposite direction (image facing out).

More rigorous tests for flexibility include crushing the printed image into a ball followed by flattening it out and evaluating flaking or delamination of the ink.

EXAMPLE 1

Adhesion tests were performed for three formulations, A, B and C, that had the weight % compositions shown in Table 3.

TABLE 3

| Component | A wt. % | B wt. % | C wt. % |
|---|---|---|---|
| Cyan Pigment | 3.5 | 3.5 | 3.5 |
| CN-2300 | 9.0 | 9.0 | 9.0 |
| SR-9209A | — | — | 15.0 |
| TMPTA(1/1) | 23.0 | 23.0 | 22.0 |
| (PO)NPGDA | 8.5 | 8.5 | 5.5 |
| IBOA | 25.0 | 27.0 | 16.5 |
| Styrene | — | 1.0 | 3.0 |
| HDDA | 11.5 | 14.5 | 8.0 |
| CHDDA | 5.0 | 3.0 | — |
| (PO)HDDA | — | — | 5.0 |
| TEGORAD ® 2200N | 0.5 | 0.5 | 0.5 |
| EBA | 5.0 | — | — |
| DAROCURE ® 4265 | 9.0 | 10.0 | 9.0 |

As seen in Table 2, formulation A included 5 weight % of solvent, EBA, while formulations B and C did not include a solvent. In contrast to formulation A, formulations B and C included, respectively 1 weight % and 3 weight % of a non-alkoxylated reactive component, styrene. In contrast to formulations A and B, formulation C included 15 weight % of SR-9209A. Formulations A and B included CHDDA and no (PO)HDDA. Formulation C included (PO)HDDA and no CHDDA.

The formulations were applied to the following substrates: polystyrene copolymer (shown in the table as styrene) film polycarbonate (LEXAN®), obtained from GE Polymer Shapes.

Adhesion to the substrate was measured using a cross-hatch test with 1.5 millimeter (mm) blade spacing, according to ASTM D 3359-97, as described above. Adhesion results are shown in Table 4.

TABLE 4

| Substrate | A | B | C |
|---|---|---|---|
| Styrene Film | 5 | 5 | 2 |
| Styrene Sheet | 4 | — | — |
| Polycarbonate | 1 | 0 | 4+ |
| Acrylic | 0 | — | 3 |

As seen in Table 4, formulations A and B showed no flaking or only slight flaking from styrene substrates. Formulation C showed adherence to polycarbonate but was less effective in its adhesion towards a styrene substrate. The results indicated that the presence of the polar solvent EBA in the ink resulted in a formulation with good adhesion properties towards styrene-based substrates.

EXAMPLE 2

Formulations D, E and F had the compositions shown in Table 5.

TABLE 5

| Component | D wt % | E wt % | F wt % |
|---|---|---|---|
| Cyan Pigment | 3.0 | 3.0 | 3.5 |
| CN-2300 | 9.0 | 9.0 | 9.0 |
| SR-9209A | — | — | 15.0 |
| TMPTA(1/1) | 23.0 | 23.0 | 22.0 |
| (PO)NPGDA | 8.5 | 8.5 | 8.5 |
| IBOA | 25.0 | 25.0 | 16.5 |
| CHDDA | 5.0 | 5.0 | — |
| Styrene | — | — | 3.0 |
| HDDA | — | — | 8.0 |
| (PO)HDDA | 11.0 | 11.0 | 5.0 |
| TEGORAD ® 2200N | 0.5 | 0.5 | 0.5 |
| EBA | 5.0 | 5.0 | — |
| Benzophenone | 5.0 | — | — |
| CN-386 | 5.0 | — | — |
| LUCERIN ® TPO-L | — | 10.0 | — |
| DAROCURE ® 4265 | — | — | 9.0 |

These formulations can also be made using Darocure BP and CN-386 with or without the Darocure 4365. Using the mercury arc lamps, inks containing only the Darocure 4265 do not cure as readily and require some of the Darocure BP/CN-386 as aids. When using the xenon lamp, the reverse is true.

Formulations D and E included 5 weight % of solvent (EBA). Formulation F did not include EBA and included styrene monomer.

A control formulation was prepared according to Example 3 in U.S. Patent Application 2002/0086914, Lee et al., published on Jul. 4, 2002. The formulation differed slightly from that in the referenced example due to the pigment source and carrier composition used. Since the formulation did not cure properly and remained tacky even after significant exposure to UV radiation (xenon lamp), it could not be confidently tested for adhesion.

Ink was deposited onto several substrates: bisphenol A base polycarbonate (LEXAN®); a modified polystyrene (referred to in the art as styrene); acrylic (PLEXIGLASS®), obtained from ATOFINA; polypropylene (COROPLAST®)), obtained from Coroplast; and polyethylene terephthalate glycol ester (PETG), obtained from GE Polymer Shapes. The substrates were not pretreated.

Adhesion was determined as described above and was compared to that of four commercially available inks: Sunjet (from Coates); a commercially available ink (Series 5000 UV) obtained from 3M; and inks available under designation of Avecia and Sericol.

TABLE 6

| Substrate | D | E | F | SUNJET ® | SERIES 5000 UV | AVECIA ® | SERICOL ® |
|---|---|---|---|---|---|---|---|
| 0.125"Styrene | 5 | 4 | 3 | 4 | 0 | 5 | 1 |
| polycarbonate | 5 | 0 | 4+ | 0 | 5 | 0 | 0 |
| Acrylic | 0 | 0 | 3-5 | 0 | 0 | 0 | 0 |
| polypropylene | 3 | 4 | | 4 | 1 | 0 | 0 |
| PETG | 3-5 | | | 2 | 0 | 0 | 0 |

As seen in Table 6, adhesion of formulation D to the styrene substrate was comparable or better than conventional formulations AVECIA® or SUNJET®. Furthermore, formulation D also showed excellent adhesion to the polycarbonate LEXAN® substrate, whereas, both SUNJET® and AVECIA® performed poorly in adhesion tests to LEXAN®. Formulation D also had superior adhesion properties to the PETG substrate, when compared to any of the commercial formulations tested.

Formulation E was comparable in performance to commercial formulation SUNJET®, as with SUNJET®, and was found to adhere very well to both styrene and polypropylene.

In contrast to the commercially available formulations, formulation F also had good adhesion with respect to the acrylic-based substrate.

EXAMPLE 3

Two additional formulations, G and H, were prepared and had the compositions shown in Table 7. Solvent EBA (5 weight %) was present in formulation H and not in formulation G.

TABLE 7

| Component | G wt % | H wt % |
|---|---|---|
| Cyan Pigment | 3.0 | 3.0 |
| CN-2300 | 9.0 | 9.0 |
| SR-9209A | 5.0 | — |
| TMPTA(1/1) | 21.0 | 23.0 |
| (PO)NPGDA | 3.5 | 8.5 |
| DPGDA | 15.0 | — |
| THFFA | — | 21.0 |
| IBOA | 20.0 | — |
| CHDDA | 5.0 | 5.0 |
| (PO)HDDA | 8.0 | 11.0 |
| TEGORAD ® 2200N | 0.5 | 0.5 |
| EBA | — | 5.0 |
| Benzophenone | 5.0 | 5.0 |
| CN-386 | 5.0 | 5.0 |
| DAROCURE ® 4265 | — | 4.0 |

Adhesion tests were conducted as described above and results are shown in Table 8.

TABLE 8

| Substrate | G 03-019D | H 03-021C | SUNJET ® | SERIES 5000 UV | AVECIA ® | SERICOL ® |
|---|---|---|---|---|---|---|
| 0.125" Styrene | 0 | 5 | 4 | 0 | 5 | 1 |
| polycarbonate | 4-5 | 5 | 0 | 5 | 0 | 0 |
| Acrylic | 0 | 0 | 0 | 0 | 0 | 0 |
| polypropylene | 3-4 | 2-3 | 4 | 1 | 0 | 0 |
| PETG | 4-5 | 5 | 2 | 0 | 0 | 0 |

Formulation G had good adhesion properties with respect to polycarbonate, polypropylene and PETG substrates. Formulation H had superior adhesion to styrene, polycarbonate and PETG and also adhered to polypropylene. Both formulations perfumed at least as well or better than the controls tested with respect to several substrates.

EXAMPLE 4

The compositions of the new formulations prepared in the Examples 1, 2 and 3, are shown in Tables 9 and 10. Table 8 gives the weight % composition of formulations A, D, E and H, which included 5% by weight EBA. Table 9, shows the weight % composition of solvent-less formulations B, C, F and G. Adhesion data of all formulations (A-H) are presented in Table 11.

TABLE 9

| Component | A wt. % | D wt. % | E wt. % | H wt. % |
|---|---|---|---|---|
| Cyan Pigment | 3.5 | 3.0 | 3.0 | 3.0 |
| CN-2300 | 9.0 | 9.0 | 9.0 | 9.0 |
| SR-9209A | 0 | 0 | 0 | 0 |
| TMPTA(1/1) | 23.0 | 23.0 | 23.0 | 23.0 |
| (PO)NPGDA | 8.5 | 8.5 | 8.5 | 8.5 |
| DPGDA | 0 | 0 | 0 | 0 |
| THFFA | 0 | 0 | 0 | 21.0 |
| IBOA | 25.0 | 25.0 | 25.0 | 0 |
| Styrene | 0 | 0 | 0 | 0 |
| CHDDA | 5.0 | 5.0 | 5.0 | 5.0 |
| (PO)HDDA | 0 | 11.0 | 11.0 | 11.0 |
| HDDA | 11.5 | 0 | 0 | 0 |
| TEGORAD ® 2200N | 0.5 | 0.5 | 0.5 | 0.5 |
| EBA | 5.0 | 5.0 | 5.0 | 5.0 |
| Benzophenone | 0 | 5.0 | 0 | 5.0 |
| CN-386 | 0 | 5.0 | 0 | 5.0 |
| DAROCURE ® 4265 | 9.0 | 0 | 0 | 4.0 |
| LUCERIN ® TPO-L | 0 | 0 | 10.0 | 0 |

TABLE 10

| Component | B wt. % | C Wt. % | F wt. % | G wt. % |
|---|---|---|---|---|
| Cyan Pigment | 3.5 | 3.5 | 3.5 | 3.0 |
| CN-2300 | 9.0 | 9.0 | 9.0 | 9.0 |
| SR-9209A | 0 | 15.0 | 15.0 | 5.0 |
| TMPTA(1/1) | 23.0 | 22.0 | 22.0 | 21.0 |
| (PO)NPGDA | 8.5 | 8.5 | 8.5 | 3.5 |
| DPGDA | 0 | 0 | 0 | 15.0 |
| THFFA | 0 | 0 | 0 | 0 |
| IBOA | 27.0 | 16.5 | 16.5 | 20.0 |
| Styrene | 1.0 | 3.0 | 3.0 | — |
| CHDDA | 3.0 | 0 | 0 | 5.0 |
| (PO)HDDA | 0 | 5.0 | 5.0 | 8.0 |
| HDDA | 14.5 | 8.0 | 8.0 | 0 |
| TEGORAD ® 2200N | 0.5 | 0.5 | 0.5 | 0.5 |
| EBA | 0 | 0 | 0 | 0 |
| Benzophenone | 0 | 0 | 0 | 5.0 |
| CN-386 | 0 | 0 | 0 | 5.0 |
| DAROCURE ® 4265 | 10.0 | 9.0 | 9.0 | 0 |
| LUCERIN ® TPO-L | 0 | 0 | 0 | 0 |

TABLE 11

| Substrate | A | D | E | H | B | C | F | G |
|---|---|---|---|---|---|---|---|---|
| Styrene film | 5 | N/A | N/A | N/A | 5 | 2 | N/A | N/A |
| Styrene sheet | 4 | N/A | N/A | N/A | N/A | N/A | N/A | N/A |
| 0.125"Styrene | N/A | 5 | 4 | 5 | N/A | N/A | 3 | 0 |
| Polycarbonate | 1 | 5 | 0 | 5 | 0 | 4+ | 4+ | 4-5 |
| Acrylic | 0 | 0 | 0 | N/A | N/A | 3 | 3-5 | N/A |
| Polypropylene | N/A | 3 | 4 | 2-3 | N/A | N/A | 3 | 3-4 |
| PETG | N/A | 3-5 | N/A | 5 | N/A | N/A | N/A | 4-5 |

The following trends were observed. As seen in Table 11, all ink formulations that included the solvent EBA exhibited excellent adhesion to styrene-based substrates.

In addition, formulations D and H had excellent adhesion to the bisphenol A polycarbonate substrate. The performance of these two formulations with respect to polycarbonate-based substrates appeared slightly better when compared to formulations C, F and G which did not include EBA.

Formulations D and H also showed, respectively, very good or excellent adhesion to PETG. Good to excellent adhesion to this substrate also was observed for formulation G, which did not include EBA.

The presence of the solvent EBA did not enhance adhesion to acrylic substrates. In contrast, formulations C and F, which did not include EBA, had good adherence towards the acrylic substrate tested.

Among formulations that included the EBA-solvent, formulation H, that also included THFFA, and no IBOA, resulted in excellent adhesion to a wider spectrum of substrates than any of the other formulations tested, including the control formulations described in Examples 2 and 3. Formulation H also differed from other formulations in that the initiator component included a combination of compounds specifically, benzophenone, CN-386 and DAROCURE® 4265.

EXAMPLE 5

The following solvent-free ink formulations were tested on multiple substrates. The amounts (in weight percent of total formulation) and properties of these formulations are shown in Table 12 below.

TABLE 12

| Component | Cyan 5A | Magenta 5B | Yellow 5C | Black 5D |
|---|---|---|---|---|
| Pigment | 3.0 | 4.0 | 5.5 | 3.0 |
| CN-2300 | 9.0 | 9.0 | 9.0 | 9.0 |
| SR-9209A | 5.0 | 5.0 | 5.0 | 5.0 |
| (EO)TMPTA | 23.0 | 23.0 | 22.2 | 23.0 |
| (PO)NPGDA | 6.0 | 4.0 | 4.3 | 5.0 |
| THFFA | 23.0 | 16.0 | 23.0 | 24.0 |
| DPGDA | 0 | 10.5 | 0 | 0 |
| (PO)HDODA | 12.0 | 9.5 | 12.0 | 12.0 |
| CHDODA | 5.0 | 5.0 | 5.0 | 5.0 |
| TEGORAD 2200N | 0.02 | 0.02 | 0.02 | 0.02 |
| Darocure 4265 | 4.0 | 4.0 | 4.0 | 4.0 |
| Darocure BP | 5.0 | 5.0 | 5.0 | 5.0 |
| CN-386 | 5.0 | 5.0 | 5.0 | 5.0 |
| Viscosity at 35° C. (cps) | 16.6 | 22.9 | 17.8 | 15.0 |
| Adhesion | | | | |
| LEXAN | 4 | 5 | 4 | 4 |
| Modified Polystyrene (non corona treated) | 5 | 5 | 5 | 5 |
| ABS | 5 | 5 | 5 | 5 |
| PETG | 5 | 5 | 5 | 5 |
| Coroplast | 3 | 3 | 4 | 2 |
| 3M Controltac 180-10 PSA | 5 | 5 | 5 | 5 |
| Mii PSA | 5 | 5 | 5 | 5 |
| Sintra | 5 | 5 | 5 | 5 |
| Pencil Hardness | HB | BH-F | HB | B-HB |

As seen in Table 12, the formulations have excellent adhesion to several types of substrate materials and good hardness.

EXAMPLE 6

Another solvent free magenta ink composition had the composition and properties shown in Table 13, below. Amounts are given in weight percent of total formulation.

As seen in Table 13, below, the composition had excellent adhesion to multiple substrates and hardness on the pencil hardness scale.

TABLE 13

| Component | Magenta 6A |
|---|---|
| Pigment | 4.0 |
| CN-2300 | 9.0 |
| SR-9209A | 5.0 |
| (EO)TMPTA | 23.0 |
| (PO)NPGDA | 4.0 |
| THFFA | 15.5 |
| DPGDA | 10.5 |
| (PO)HDODA | 9.0 |
| CHDODA | 5.0 |
| TEGORAD 2200N | 0.02 |
| Darocure 4265 | 0 |
| Darocure BP | 7.5 |
| CN-386 | 7.5 |
| Viscosity at 35° C. (cps) | 23.0 |
| Adhesion | |
| LEXAN | 5 |
| Modified Polystyrene (non corona treated) | 5 |
| ABS | |
| PETG | |
| Coroplast | 5 |
| 3M Controltac 180-10 PSA | |
| Mii PSA | |
| Sintra | |
| Pencil Hardness | F, 2H |

EXAMPLE 7

Additional solvent free ink formulations were developed for use on vinyl and polystyrene based substrates. Amounts are given in weight percent of total formulation. Properties are shown in Table 14 below.

TABLE 14

| Component | Cyan 7A | Magenta 7B | Yellow 7C | Black 7D |
|---|---|---|---|---|
| Pigment | 3.0 | 4.0 | 5.5 | 3.0 |
| CN-2300 | 9.0 | 9.0 | 9.0 | 9.0 |
| SR-9209A | 5.0 | 4.1 | 4.3 | 10.0 |
| (EO)TMPTA | 22.0 | 22.0 | 22.0 | 22.0 |
| (PO)NPGDA | 20.5 | 4.1 | 15.4 | 7.0 |
| IBOA | 25.0 | 45.2 | 30.0 | 25.0 |
| (PO)HDODA | 5.0 | 4.1 | 4.3 | 9.5 |
| TEGORAD 2200N | 0.5 | 0.5 | 0.5 | 0.5 |
| Darocure 4265 | 10.0 | 7.0 | 9.0 | 14.0 |
| Viscosity at 35° C. (cps) | 23.1 | 24.2 | 23.8 | 23.4 |
| Adhesion | | | | |
| LEXAN | 5 | 5 | 5 | 5 |
| Modified Polystyrene (corona treated) | 5 | 5 | 5 | Nt |
| 3M Controltac 180-10 PSA | 5 | 5 | 5 | 5 |
| Mii PSA | 5 | 5 | 5 | 5 |
| Avery PSA | 5 | 5 | 5 | 5 |
| Pencil Hardness | NA | NA | NA | NA |

The compositions shown in Table 14 had excellent adhesion to several substrates.

EXAMPLE 8

Several solvent free ink formulations were prepared in the amounts (weight percent of total formulation) shown below in Table 15. The properties of these inks also are shown in the table.

The compositions had excellent adhesion to multiple substrates and generally good hardness.

TABLE 15

| Component | Cyan 8A | Magenta 8B | Yellow 8C | Black 8D |
|---|---|---|---|---|
| Pigment | 2.25 | 4.0 | 5.5 | 3.0 |
| CN2300 oligomer | 2.0 | 2.0 | 2.0 | 2.0 |
| SR-9209A | 5.0 | 5.0 | 5.0 | 5.0 |
| (EO)TMPTA | 29.0 | 29.0 | 29.0 | 29.0 |
| (PO)NPGDA | 8.7 | 9.0 | 7.0 | 7.0 |
| THFFA | 22.0 | 22.0 | 22.0 | 21.0 |
| (PO)HDODA | 12.0 | 10.0 | 10.5 | 11.0 |
| CHDODA | 5.0 | 5.0 | 5.0 | 5.0 |
| TEGORAD 2200N | 0.02 | 0.02 | 0.02 | 0.02 |
| Darocure 4265 | 4.0 | 4.0 | 4.0 | 4.0 |
| Darocure BP | 5.0 | 5.0 | 5.0 | 5.0 |
| CN-386 | 5.0 | 5.0 | 5.0 | 5.0 |
| Viscosity at 35° C. (cps) | 15.3 | 21.3 | 16.8 | 14.7 |
| Adhesion | | | | |
| LEXAN | 3 | 3 | 4 | 2 |
| Polystyrene copolymer (non corona treated) | 5 | 4 | 5 | 5 |
| ABS | 5 | 5 | 5 | 5 |
| PETG | 5 | 5 | 5 | 5 |
| Colorplast | 5 | 4 | 5 | 3 |
| 3M Controltac 180-10 PSA | 5 | 5 | 5 | 5 |
| Mii PSA | 5 | 5 | 5 | 4 |
| Sintra | 5 | 5 | 5 | 5 |
| Pencil Hardness (approx., avg) | HB | HB/F | HB/F | 2B/B |

EXAMPLE 9

Table 16, below, shows amounts and properties of additional ink formulations suitable for printing on multiple substrates. Amounts are given in weight percent of total formulation.

The ink compositions had good adhesion to multiple substrates; those including cyan, magenta and yellow pigment had a harness of HB on the pencil hardness scale.

TABLE 16

| Component | Cyan 9A | Magenta 9B | Yellow 9C | Black 9D |
|---|---|---|---|---|
| Pigment | 2.25 | 4.0 | 5.5 | 3.0 |
| EBECRYL ® 1810 | 9.0 | 7.0 | 8.0 | 11.0 |
| SR-9209A | 5.73 | 6.0 | 5.0 | 5.5 |
| (EO)TMPTA | 23.0 | 24.0 | 23.0 | 23.0 |
| (PO)NPGDA | 6.0 | 5.0 | 4.3 | 4.5 |
| THFFA | 23.0 | 25.0 | 23.0 | 22.0 |
| (PO)HDODA | 11.0 | 9.0 | 11.2 | 11.0 |
| CHDODA | 5.0 | 5.0 | 5.0 | 5.0 |
| TEGORAD 2200N | 0.02 | 0.02 | 0.02 | 0.02 |
| Darocure BP | 7.5 | 7.5 | 7.5 | 7.5 |
| CN-386 | 7.5 | 7.5 | 7.5 | 7.5 |
| Viscosity at 35° C. (cps) | 15.2 | 18.3 | 16.6 | 14.9 |
| Adhesion | | | | |
| LEXAN | 4 | 4 | 4 | 3 |
| Polystyrene copolymer (non corona treated) | 5 | 5 | 5 | 5 |
| ABS | 5 | 5 | 5 | 5 |
| PETG | 5 | 5 | 5 | 5 |
| Colorplast | 4 | 4 | 5 | 5 |
| 3M Controltac 180-10 PSA | 5 | 5 | 5 | 4 |
| Mii PSA | 5 | 4 | 5 | 4 |
| Sintra | 5 | 5 | 5 | 5 |
| Pencil Hardness (approx., avg) | HB | HB | HB | 2B |

EXAMPLE 10

Additional ink solvent free ink formulations suitable for printing on multiple substrates and their properties are shown in Table 17, below. Amounts are given in weight percent of total formulation. The inks are suitable for use on multiple substrates.

The inks had a hardness between B and 2B, on the pencil hardness scale.

TABLE 17

| Component | Cyan 10A | Magenta 10B | Yellow 10C | Black 10D |
|---|---|---|---|---|
| Pigment | 2.25 | 4.0 | 5.5 | 3.0 |
| EBECRYL ® 1810 | 8.0 | 7.0 | 8.0 | 11.0 |
| SR-9209A | 5.73 | 5.0 | 5.0 | 5.5 |
| (EO)TMPTA | 23.0 | 24.0 | 23.0 | 23.0 |
| (PO)NPGDA | 6.0 | 4.0 | 4.3 | 4.5 |
| THFFA | 14.0 | 16.0 | 13.0 | 12.0 |
| DPGDA | 10.0 | 10.5 | 10.0 | 10.0 |
| (PO)HDODA | 11.0 | 9.5 | 11.2 | 11.0 |
| CHDODA | 5.0 | 5.0 | 5.0 | 5.0 |
| TEGORAD 2200N | 0.02 | 0.02 | 0.02 | 0.02 |
| Darocure BP | 7.5 | 7.5 | 7.5 | 7.5 |
| CN-386 | 7.5 | 7.5 | 7.5 | 7.5 |
| Viscosity at 35° C. (cps) | 16.7 | Nt | 19.1 | Nt |
| Adhesion | | | | |
| LEXAN | 4 | 3 | 4 | 4 |
| Polystyrene copolymer (non corona treated) | 5 | 5 | 5 | 5 |
| ABS | 5 | 5 | 5 | 4 |
| PETG | 5 | 5 | 5 | 5 |
| Colorplast | 3 | 5 | 5 | 5 |
| 3M Controltac 180-10 PSA | 5 | 5 | 5 | 5 |
| Mii PSA | 5 | 5 | 5 | 4 |
| Sintra | 5 | 5 | 5 | Nt |
| Pencil Hardness (approx., avg) | B | B | HB | 2B |

EXAMPLE 11

Another ink formulation and its properties are shown in Table 18. Amounts are presented in weight percent of the total formulation. As seen in Table 18, the formulation has excellent adhesion to a variety of substrates and good pencil hardness properties.

TABLE 18

| Component | Cyan 11A | Magenta 11B | Yellow 11C | Black 11D |
|---|---|---|---|---|
| Pigment | 2.3 | 2.8 | 5.5 | 3.0 |
| CN2300 | 2.0 | 2.0 | 2.0 | 2.0 |
| SR-9209A | 5.0 | 5.0 | 5.0 | 5.0 |
| (EO)TMPTA | 29.0 | 29.0 | 29.0 | 29.0 |
| (PO)NPGDA | 7.7 | 8.4 | 7.0 | 7.0 |
| THFFA | 22.0 | 22.0 | 21.0 | 22.0 |
| (PO)HDODA | 11.0 | 9.8 | 9.5 | 11.0 |
| CHDODA | 5.0 | 5.0 | 5.0 | 5.0 |
| TEGORAD 2200N | 0.03 | 0.03 | 0.03 | 0.03 |
| Darocure 4265 | 2.0 | 2.0 | 2.0 | 2.0 |
| Darocure BP | 7.0 | 7.0 | 7.0 | 7.0 |
| CN-386 | 7.0 | 7.0 | 7.0 | 7.0 |
| Viscosity at 35° C. (cps) | 14.4 | 17.1 | 17.1 | 17.1 |
| Adhesion | | | | |
| LEXAN | 5 | 5 | 5 | 5 |
| Polystyrene copolymer (non corona treated) | 5 | 4 | 5 | 5 |
| ABS | 5 | 5 | 5 | 5 |
| PETG | 5 | 5 | 5 | 5 |
| Coroplast | 3 | 4 | 5 | 2 |
| 3M Controltac 180-10 PSA | 5 | 5 | 5 | 5 |
| Mii PSA | 5 | 5 | 5 | 5 |
| Sintra | 5 | 5 | 5 | 5 |
| Pencil Hardness (approx., avg) | HB | HB | HB/F | B |

The foregoing merely illustrates the principles of this invention, and various modifications can be made by persons of ordinary skill in the art without departing from the scope and spirit of this invention.

The invention claimed is:

1. A printing method comprising:
   a) depositing a curable ink composition from an inkjet print head onto a substrate, wherein the ink composition comprises:
      i. a first curable component that is present in the ink composition in an amount greater than 30 weight percent, has a functionality that is greater than 2 and a molecular weight in the range of from about 400 g/mole to about 10,000 g/mole, wherein the first curable component includes any of: (1) a hyperbranched or a dendridic acrylate oligomer; or (2) a polyester tetraacrylate oligomer;
      ii. a second curable component that has a functionality that is less than or equal to 2; and
      iii. an initiator component; and
   b) curing the ink composition.

2. The method of claim 1, wherein the ink composition is UV curable.

3. The method of claim 1, wherein the first curable component includes ethoxylated trimethyloipropane triacrylate.

4. The method of claim 3, wherein ethoxylated trimethylolpropane triacrylate is present in the radiation curable ink composition in an amount of at least about 16 weight percent.

5. The method of claim 4, wherein ethoxylated trimethylolpropane triacrylate is present in the radiation curable ink composition in an amount in the range of from about 22 to about 31 weight percent.

6. The method of claim 1, wherein the first curable component includes a hyperbranched or dendridic acrylate oligomer that is present in the radiation curable ink composition in an amount of no more than 9 weight percent.

7. The method of claim 1, wherein the first curable component has a viscosity greater than 50 centipoise at 25° Celsius.

8. The method of claim 1, wherein the second curable component includes at least one monofunctional (meth)acrylate compound and at least one difunctional (meth)acrylate compound.

9. The method of claim 1, wherein the second curable component includes ethoxylated (2) neopentylglycol diacrylate, propoxylated (2) neopentylglycol diacrylate, 1,4-cyclohaxanedimethanol diacrylate, tetrahydrofurfuryl acrylate, isobornyl acrylate, ethoxylated 1,6-hexanediol diacrylate, propoxylated-1,6-hexanediol diacrylate, dipropylene glycol diacrylate or any combination thereof.

10. The method of claim 1, wherein the second curable component is present in the curable ink composition in an amount of less than about 70 weight percent.

11. The method of claim 10, wherein the second curable component is present in the curable ink composition in an amount in the range of from about 45 to about 51 weight percent.

12. The method of claim 1, wherein the second curable component has a viscosity that is less than 50 centipoise at 25° centigrade.

13. The method of claim 1, wherein the initiator component includes at least one photoinitiator.

14. The method of claim 1, wherein the initiator component is present in the curable ink composition in an amount in the range of from about 2 to about 20 weight percent.

15. The method of claim 14, wherein the initiator component is present in the curable ink composition in an amount in the range of from about 7 to about 16 weight percent.

16. The method of claim 1, further including any of a pigment, a solvent and a surface tension modifier.

17. The method of claim 1, wherein the radiation curable ink composition has a viscosity that is less than 25 centipoise at jet temperature.

18. The method of claim 17, wherein the radiation curable ink composition has a viscosity in the range of from 10 to about 13 centipoise at a temperature in the range of from about 40° C. to about 58° C.

19. The method of claim 1, wherein the radiation curable ink composition has a surface tension that is less than 30 dynes/cm$^2$.

20. The method of claim 19, wherein the radiation curable ink composition has a surface tension in the range of from about 25.5 to about 26.5 dynes/cm$^2$.

* * * * *